United States Patent [19]

Tsutsumi et al.

[11] Patent Number: 5,108,278
[45] Date of Patent: Apr. 28, 1992

[54] RESIN SEALING APPARATUS

[75] Inventors: Yasutsugu Tsutsumi; Sueyoshi Tanaka; Yutaka Morita, all of Fukuoka, Japan

[73] Assignee: Mitsubishi Denki Kabushiki Kaisha, Tokyo, Japan

[21] Appl. No.: 666,562

[22] Filed: Mar. 8, 1991

Related U.S. Application Data

[63] Continuation of Ser. No. 472,807, Jan. 31, 1990, abandoned.

[30] Foreign Application Priority Data

Feb. 3, 1989 [JP] Japan .................................. 1-26133

[51] Int. Cl.⁵ ...................... B29C 45/02; B29C 33/30
[52] U.S. Cl. ...................................... 425/116; 249/95; 264/272.17; 425/121; 425/125; 425/186; 425/192 R; 425/544; 425/588; 425/DIG. 228
[58] Field of Search ................. 264/272.11, 272.17, 264/272.15; 437/207, 211, 212, 219; 425/116, 186, 190, 192 R, 543, 544, 183, 185, 193, 195, 123, 125, 588, DIG. 228, 121; 249/95

[56] References Cited

U.S. PATENT DOCUMENTS

| 3,596,317 | 8/1971 | Nicholson | 425/195 |
| 4,202,522 | 5/1980 | Hanas et al. | 425/192 R |
| 4,513,942 | 4/1985 | Creasman | 264/272.17 |
| 4,544,340 | 10/1985 | Hehl | 425/183 |
| 4,599,062 | 7/1986 | Konishi | 264/272.17 |
| 4,812,114 | 3/1989 | Kennon et al. | 425/544 |
| 4,828,479 | 5/1989 | Pleasant | 425/192 R |

FOREIGN PATENT DOCUMENTS

| 831602 | 2/1952 | Fed. Rep. of Germany | 425/193 |
| 60-58813 | 4/1985 | Japan . | |
| 61-135719 | 6/1986 | Japan . | |
| 1-198308 | 8/1989 | Japan | 425/125 |
| 1-208110 | 8/1989 | Japan | 425/406 |
| 345007 | 7/1970 | U.S.S.R. | 425/193 |
| 1211066 | 2/1986 | U.S.S.R. | 425/544 |

Primary Examiner—Jay H. Woo
Assistant Examiner—Khanh P. Nguyen
Attorney, Agent, or Firm—Oblon, Spivak, McClelland, Maier & Neustadt

[57] ABSTRACT

A resin sealing apparatus includes upper and lower dies each having a chase block with a plurality of cavities into which molten resin is injected and a supporting member for supporting the chase block, the chase blocks of the upper and lower dies being fitted to each other, and a position determining member attached to a center block so that the positions of the chase blocks are determined when they are assembled, wherein each of the chase blocks is attached to each of the supporting members so as to be movable in the vertical and lateral directions within given ranges. The center block is provided on the supporting member and is disposed between two of the chase block with center plates interposed therebetween to form an integral unit.

6 Claims, 6 Drawing Sheets

RESIN SEALING APPARATUS

This application is a continuation of application Ser. No. 07/472,807, filed on Jan. 31, 1990, now abandoned.

BACKGROUND OF THE INVENTION

1. Field of the Invention

The present invention relates to a resin sealing apparatus for sealing an article to be sealed such as, for instance, a semiconductor device with resin.

2. Discussion of Background

FIGS. 12 and 13 are respectively a plane view and a side view showing a conventional resin sealing apparatus which specifically show a lower die for sealing a semiconductor device with resin. In FIGS. 12 and 13, a reference numeral 1 designates a base, a numeral 2 designates an ejector portion fixed onto the base 1, a numeral 3 designates a surface plate fixed onto the ejector portion 2, which includes a heater (not shown), a numeral 4 designates a chase block mounted on the surface plate 3, numerals 5 designate knock pins inserted in the chase block 4 and the surface plate 3, and numerals 6A designate bolts for fixing the chase block 4 to the surface plate 3. The chase block 4 is supported by the surface plate 3 which functions as a supporting member. The heads of the knock pins 5 and the bolts 6A respectively sink in the chase block 4 so as not to project from the upper surface of the chase block. Numerals 7 and 8 respectively designate cavities and runners formed in the chase block 4, numerals 9 designate end plates attached to a pair of opposing sides of the chase block 4 to close free ends of the runners 8, numerals 10 and 11A designate respectively guide pins in a cylindrical form which are fixed to the surface plate 3. An upper die (not shown) having a similar construction to the lower die is located facing the lower die. The upper die is provided with a position determining block 11B (which is indicated by an imaginary line) so as to be fitted to the position determining block 11A of the lower die. The fitting of the position determining blocks 11A and 11B is performed by convex and concave portions formed in the blocks. The upper die is also provided with guide pins which have fitting portions such as round holes or cylindrical projections so as to face the guide pins 10 mounted on the lower die so that the chase blocks of the upper and lower dies are assembled by fitting the position determining blocks 11A, 11B and the guide pins.

The function of the conventional resin sealing apparatus will be described.

Lead frames (not shown) each having a semiconductor device (not shown) and a wire bonded thereto are placed in the cavities 7 of the chase block 4 of the lower die. The upper and lower dies are assembled and fastened by means of a pressing machine (not shown) by fitting the fitting portions of the guide pins and the position determining blocks 11A, 11B of the upper and lower dies. Since the positions of the chase block 4 and the surface plate 3 are determined by means of the knock pins 5 in the upper and lower dies respectively, the positions of the chase blocks of the upper and lower dies are indirectly determined and they are assembled by determining the positions of the surface plates of the upper and lower dies by means of the round holes and the cylindrical projections of the guide pins and the position determined blocks 11A, 11B. Then, resin is injected into the cavities 7 through the runners 8. After the resin is cured in the cavities of the chase blocks of the upper and lower dies, which are heated at a predetermined temperature by heaters (not shown) installed in the surface plates, the upper and lower dies are separated, and resin-molded articles (not shown) cured in the cavities 7 are raised by the ejector portions. Then, the molded articles are removed from the upper and lower dies.

In the conventional resin sealing apparatus, since the positions of the chase blocks of the upper and lower dies are indirectly determined by supporting members such as the surface plates, there occurs an error in position between the chase blocks of the upper and lower dies due to an error of dimensions of the supporting members during machining and the difference of the thermal expansion of the upper and lower dies due to a change of temperature distribution of the parts of the dies. Such error in position results in faulty shape in the resin-molded articles.

SUMMARY OF THE INVENTION

It is an object of the present invention to provide a resin sealing apparatus having accurate position determining means between the chase blocks of the upper and lower dies.

The foregoing and other objects of the present invention have been attained by providing a resin sealing apparatus which comprises: upper and lower dies each having a chase block with a plurality of cavities into which molten resin is injected and a supporting member for supporting the chase block, the chase blocks of the upper and lower dies being fitted to each other, and a position determining member attached to each of the chase blocks so that the positions of the chase blocks are determined when they are assembled, wherein each of the chase blocks is attached to each of the supporting members so as to be movable.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
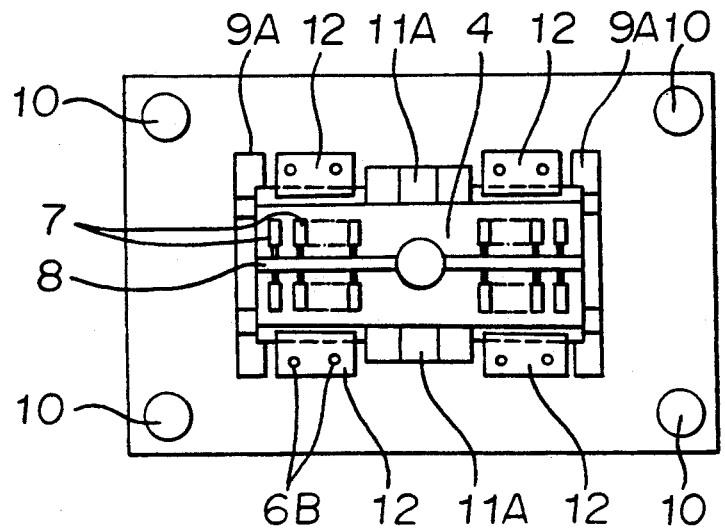
FIG. 1 is a plane view of a lower die in the resin sealing apparatus according to the present invention.

Referring to the drawings, wherein the same referense numerals designate the same or corresponding parts throughout the several views, and more particularly to FIGS. 1 through 6 thereof, there is shown an embodiment of the resin sealing apparatus of the present invention. In the FIGS. 1 through 6, reference numerals 1-3, 7, 8 and 10 designate the same or corresponding parts as in FIGS. 12 and 13, and description of these parts is omitted.

Figure 2:
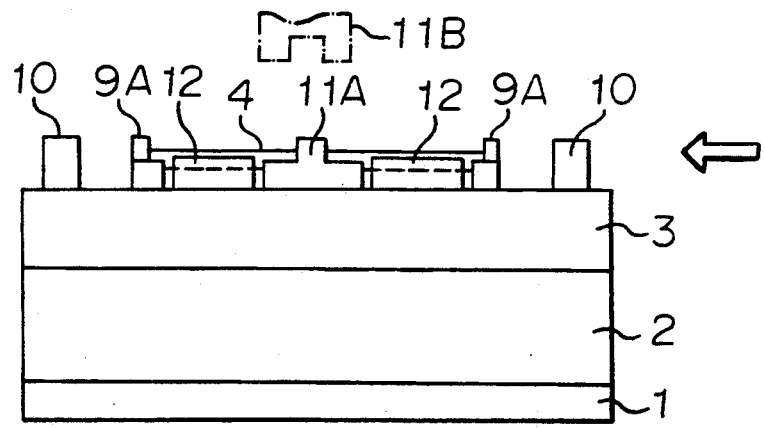
FIG. 2 is a front view of the lower die shown in FIG. 1.
Figure 3:
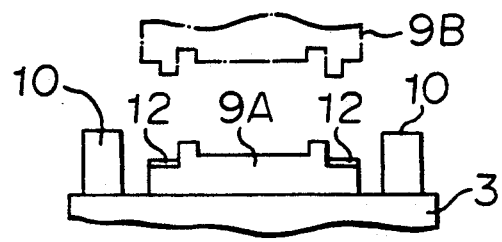
FIG. 3 is an enlarged side view of the lower die shown in FIG. 2 viewed from the side of an arrow mark.

FIGS. 1 through 3 show an embodiment of a lower die used for the resin sealing apparatus of the present invention.

Figure 6:
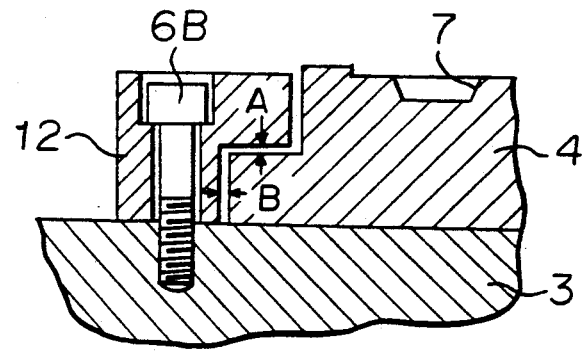
FIG. 6 is a cross-sectional view partly broken of an embodiment of a bracing plate used for the resin sealing apparatus as shown in FIGS. 1 through 5.
Figure 12:
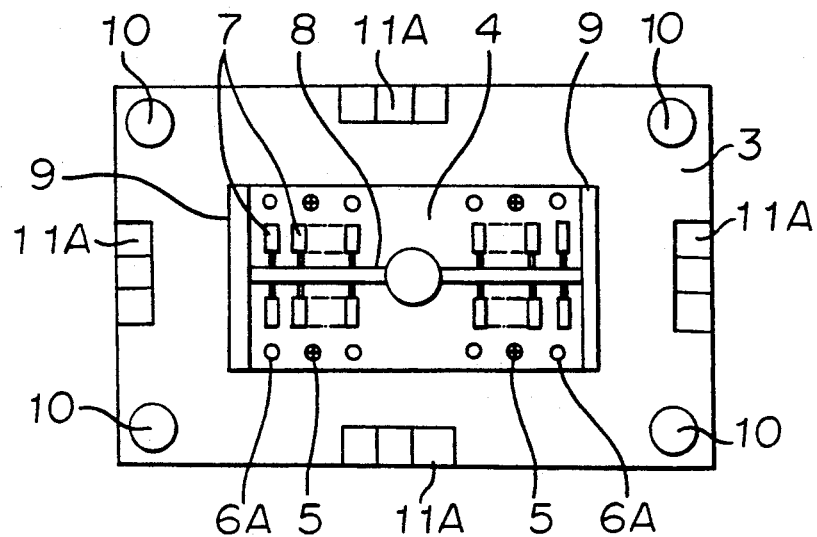
FIGS. 12 and 13 are respectively a plane view and a front view of a lower die used for a conventional resin sealing apparatus.
Figure 13:
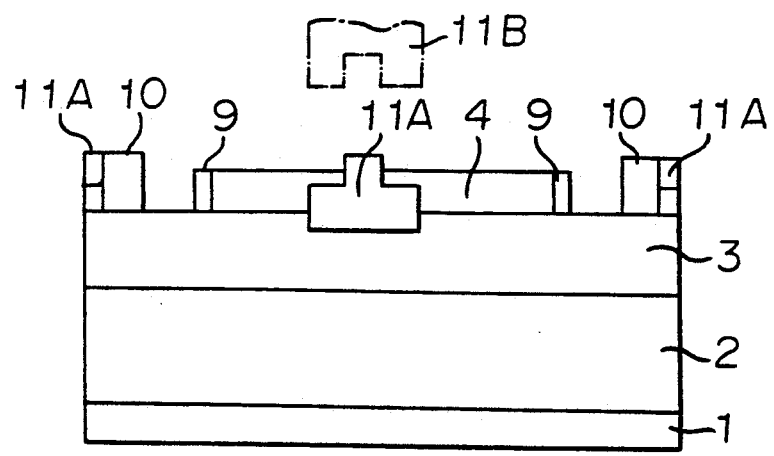

A numeral 4 designates a chase block attached to the upper surface of the surface plate 3, numerals 11A designate position determining blocks having a central projecting portion which serve as position determining members, and numerals 9A designate end plates having convex and concave portions which serve as position determining members and which also functions as the end plates in the conventional resin sealing apparatus as shown in FIGS. 12 and 13. The position determining blocks 11A and the end plates 9A are respectively attached to each opposing side surfaces of the chase block 4. Numerals 12 designate bracing plates fixed to the surface plate 3 by means of bolts 6B. FIG. 6 shows the detailed structure of one of the bracing plates 12. Bracing plates 12 are respectively formed to have inversed L-shape in transverse cross-section as shown in FIG. 6. The chase block 4 is formed to have a shape corresponding to that of the bracing plate. A gap A is formed between the chase block 4 and the bracing plates 12 in the vertical direction, and a gap B is formed between them in the lateral direction, whereby the chase block 4 can be attached to the surface plate 3 serving as a supporting member so as to be shiftable within the ranges of the gaps of A and B.

Figure 4:
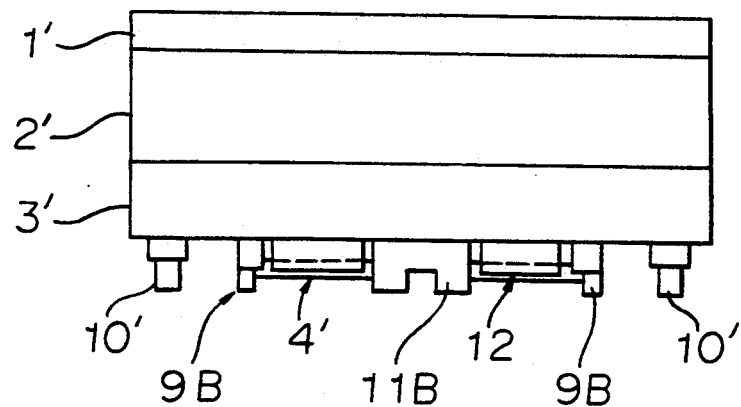
FIG. 4 is a front view of an embodiment of an upper die in the resin sealing apparatus according to the present invention.
Figure 5:
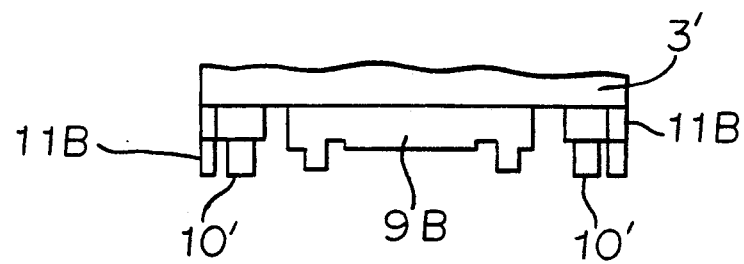
FIG. 5 is an enlarged side view partly broken of the upper die shown in FIG. 4.

An upper die as shown in FIGS. 4 and 5 has such a construction as to correspond to the that of the lower die. Namely, a pair of position determining blocks 11B are attached to a pair of opposing side surfaces of the chase block 4', and a pair of end plates 9B are attached to the other opposing side surfaces of the chase block 4'. The position determining blocks 11B respectively have a shape corresponding to that of the position determining blocks 11A of the lower die, and the end plates 9B respectively have convex and concave portions which can be fitted to those of the end plates 9A of the lower die. The upper die is also provided with guide pins 10' having fitting portions which correspond to those of the guide pins 10 of the lower die. In FIGS. 4 and 5, a numeral 1' designates a base, a numeral 2' designates an ejector portion and a numeral 3' designates a surface plate.

The function of the resin sealing apparatus of the above-mentioned embodiment will be described.

Lead frames (not shown) each having a semiconductor device (not shown) are placed on the cavities 7 of the lower die. The fitting portions of the guide pins 10, 10', the position determining blocks 11A, 11B and the end plates 9A, 9B of the upper and lower dies are respectively fitted to each other, and the dies are fastened by a pressing machine. Thus, by fitting the position determining block 11A to the position determining block 11B, the positions of the chase blocks 4, 4' of the upper and lower dies in the lateral direction in FIG. 1 are determined. On the other hand, by fitting the end plate 9A of the lower die to the end plate 9B of the upper die, the positions of the chase blocks 4, 4' in the vertical direction in FIG. 1 are determined. Further, by fitting the fitting portions (such as round holes of the guide pins 10 of the lower die to the fitting portions such as the cylindrical projections of the guide pins 10' of the upper die), the positions of the surface plates 3, 3' of the upper and lower dies are determined.

An error in dimension which may be caused due to an error in dimension of the face plates 3, 3' during machining operations and the difference of thermal expansion of the structural elements of the upper and lower dies can be absorbed by relatively moving the chase blocks 4, 4' to the surface plates 3, 3' within the gaps A, B as shown in FIG. 6, and no effect is influenced in the determination of the positions of the chase blocks. Then, resin is injected in the cavities in the same manner as the conventional apparatus so that resin-molded articles are formed so as to seal the semiconductor devices with the resin.

Figure 7:
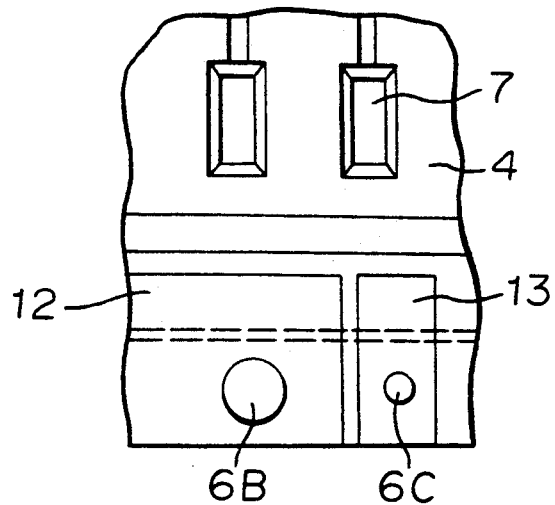
FIG. 7 is a plane view partly broken of another embodiment of the resin sealing apparatus according to the present invention.
Figure 8:
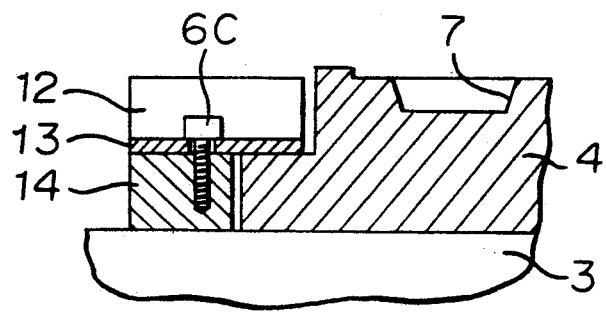
FIG. 8 is a cross sectional view partly broken of another embodiment of the bracing plate of the present invention.

FIGS. 7 and 8 show another embodiment of the lower die of the resin sealing apparatus of the present invention.

In the embodiment as shown in FIGS. 7 and 8, plate springs 13 are used in addition to the construction of the embodiment shown in FIG. 1. The chase block 4 of the lower die is attached to the surface plate 3 by bracing plates 12 while maintaining gaps between the bracing plates 12 and the chase block 4 in the lateral direction. In this embodiment, each of the bracing plates 12 comprises a fitting block 14, the plate spring 13 and a bolt 6C. The fitting block 14 is attached to the surface plate 3 and the plate spring 13 is attached to the fitting block 14 with the bolt 6C so that the chase block 4 is fixed to the surface plate 3 by the action of the plate spring 13. In a case that the plate springs 13 are used for fixing the chase block 4' to the surface plate 3' of the upper die, a force of fixing by the plate springs 13 should be stronger than the gravity of the chase block 4' whereby the chase block 4' is brought in close-contact with the surface plate 3' even when the upper die is separated from the lower die, so that good thermal conduction between the chase block 4' and the surface plate 3' is obtainable and the movement of the chase blocks 4' can be minimized.

Figure 9:
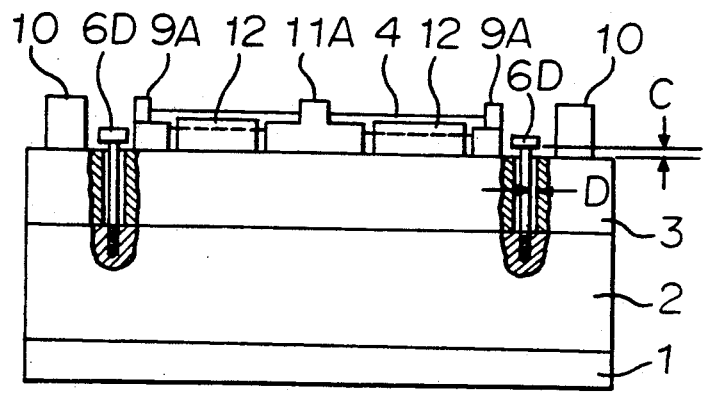
FIG. 9 is a front view partly cross-sectioned of another embodiment of the resin sealing apparatus according to the present invention.

FIG. 9 is a front view showing another embodiment of the resin sealing apparatus of the present invention. The construction of the embodiment shown in FIG. 9 is the same as that of the embodiment as shown in FIGS. 1-6 except a connecting means for the ejector portion 2 or 2' to the surface plate 3 or 3'. Description will be made as to the lower die. However, the upper die may have the same construction.

The surface plate 3 is attached to the ejector portions 2 by bolts 6D. Since gaps C and D are formed between the surface plate 3 and the bolts 6D, the surface plate 3 can be relatively moved within the ranges of the gaps C, D. Accordingly, an error in dimension due to thermal expansion of the structural elements of the lower die can be absorbed between the surface plate 3 and the ejector portion 2 even when a foreign matter enters in the gap B in FIG. 6. Thus, there is no danger in determining the positions of the chase blocks 4, 4' of the upper and lower dies.

Figure 10:
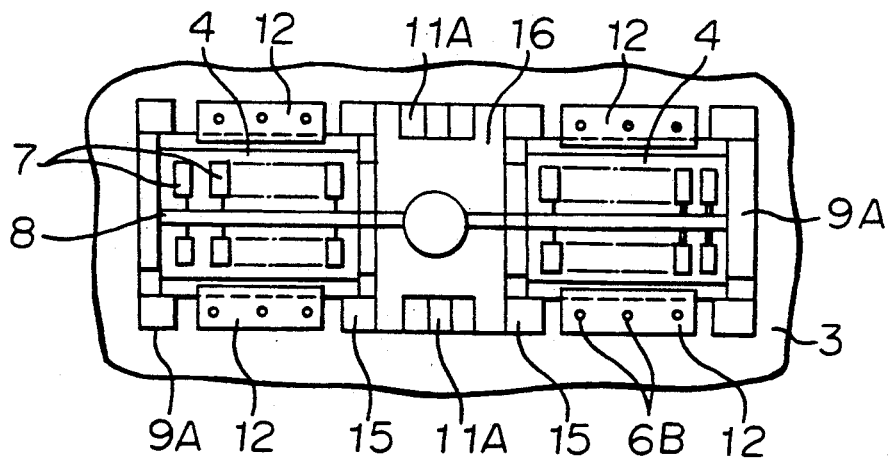
FIG. 10 is a plane view partly broken of another embodiment of the resin sealing apparatus according to the present invention.
Figure 11:
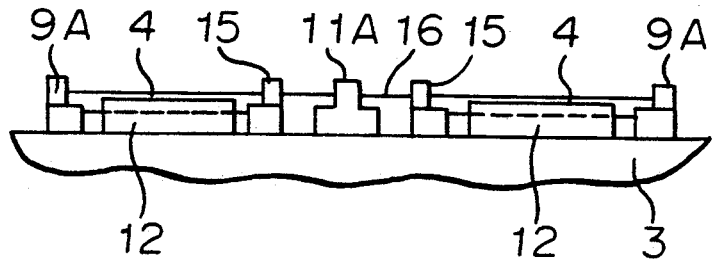
FIG. 11 is a front view partly broken of the resin sealing apparatus as shown in FIG. 10.

FIGS. 10 and 11 show still another embodiment of the resin sealing apparatus of the present invention. In the embodiment as shown in FIGS. 10 and 11, two sets of the chase blocks 4 are used.

In FIGS. 10 and 11 showing the lower die of the resin sealing apparatus of the present invention, a center block 16 is provided on the top surface of the surface plate 3 between the two chase blocks 4 interposing center plates 15 therebetween. End plates 9A are respectively attached to the end portions of the chase blocks 4 at the opposite side of the center plates 15. Position determining blocks 11A are respectively attached to the opposing surfaces of the center block 16. The end plates 9A and the position determining blocks 11A are integrally attached to the two chase blocks 4. The integrally assembled body comprising the chase blocks 4, the center block 16, the center plates 15, the end plate 9A and the position determining blocks 11A is attached to the surface plate 3 so as to be shiftable at the surface plate 3 by means of a plurality of bracing plates 12. The center plates 15 have convex and concave portions in the same manner as the end plates 9A so that they are capable of determining positions in the vertical direction of the chase blocks 4 in association with the end plates 9A in FIG. 10.

In the embodiments as described above, the chase block 4, 4' or the chase blocks 4 and 4' are attached to the surface plates 3, 3' so as to be shiftable in the upper and lower dies. However, either of the chase block 4, 4' or the chase blocks 4, 4' may be attached to the surface plate 3, 3' so as to be shiftable, and the other may be fixed thereto.

Thus, in accordance with the present invention, the positions of the chase blocks of the upper and lower dies are determined directly by position determining members mounted on the upper and lower dies. Further, an error in dimension due to the difference of thermal expansion of the structural elements of the upper and lower dies can be absorbed by the relative movement between the chase blocks and the supporting members, the position of the chase blocks can be accurately determined Obviously, numerous modifications and variations of the present invention are possible in light of the above teachings. It is therefore to be understood that within the scope of the appended claims, the invention may be practiced otherwise than as specifically described herein.

What is claimed is:

1. A resin sealing apparatus comprising:
    upper and lower dies, each of said upper and lower dies comprising a plurality of chase blocks each having a plurality of cavities into which molten resin is injected, the chase blocks of the upper and lower dies being fitted to each other;
    each of said chase blocks comprising bracing members for supporting said chase blocks on supporting members, said bracing members being positioned at opposing sides of each of said chase blocks so as to create small gaps between the side surfaces of the chase blocks and the bracing members, said small gaps permitting movement of said chase blocks with respect to the supporting member within a distance defined by said small gaps;
    wherein each of said upper and lower dies further comprises:
    a center block provided on said supporting member, said center block being disposed between two of said chase blocks and having center plates interposed between said chase blocks and said center block;
    end plates respectively attached to the end portions of the chase blocks at the opposite side of the center plates; and
    position determining means attached to opposing surfaces of said center block for determining the positions of the chase blocks in an assembled state;
    wherein said end plates and said position determining means are integrally attached to said two chase blocks to form an integrally assembled body comprising the chase blocks, the center block, the center plates, the end plate and the position determining means, the assembly being shiftable on the supporting member by means of said plurality of bracing members.

2. The resin sealing apparatus according to claim 1, wherein said position determining means comprises at least one pair of position determining blocks and at least one pair of end plates which are respectively attached to opposing side surfaces of the chase blocks of the upper and lower dies.

3. The resin sealing apparatus according to claim 2, wherein said position determining blocks and said end plates attached to the chase blocks of the upper and lower dies are respectively provided with convex and concave portions to be fitted to each other.

4. The resin sealing apparatus according to claim 2, wherein said bracing members are fixed to the supporting members to extend to a level not higher than the upper surface of each of the chase blocks, and are spaced apart from the side surfaces of the chase blocks so that the bracing members control the movement of the chase blocks in the vertical and horizontal directions with respect to the supporting members.

5. The resin sealing apparatus according to claim 2, wherein said chase block defines a step portion formed at the side surface which opposes the bracing member, and the bracing member has such a shape as to correspond to the shape of the step portion and is fixed to the supporting member to create said small gaps between said bracing member and said chase block.

6. The resin sealing apparatus according to claim 2, wherein each of said bracing members comprises a fitting block, a plate spring and a bracing plate, said fitting block being mounted on said supporting member and said plate spring being positioned between said fitting block and said bracing plate.

* * * * *